(12) United States Patent
Juang et al.

(10) Patent No.: US 8,040,639 B2
(45) Date of Patent: Oct. 18, 2011

(54) INTEGRATED SILICON MICRO-ACTUATOR SLIDER

(75) Inventors: Jia-Yang Juang, Santa Clara, CA (US); Toshiki Hirano, San Jose, CA (US); Fu-Ying Huang, San Jose, CA (US); Jifang Tian, Fremont, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 829 days.

(21) Appl. No.: 11/729,057

(22) Filed: Mar. 28, 2007

(65) Prior Publication Data

US 2008/0239571 A1  Oct. 2, 2008

(51) Int. Cl.
    G11B 5/54 (2006.01)
(52) U.S. Cl. .................................. 360/294.4
(58) Field of Classification Search ............ 360/294.3, 360/294.4, 234.7
See application file for complete search history.

(56) References Cited

U.S. PATENT DOCUMENTS

| | | | |
|---|---|---|---|
| 5,711,063 A | 1/1998 | Budde et al. | |
| 5,781,380 A * | 7/1998 | Berding et al. | 360/264.2 |
| 5,943,189 A * | 8/1999 | Boutaghou et al. | 360/234.7 |
| 6,088,907 A | 7/2000 | Lee et al. | |
| 6,362,542 B1 | 3/2002 | Novotny | |
| 6,414,823 B1 * | 7/2002 | Crane et al. | 360/294.5 |
| 6,501,623 B1 * | 12/2002 | Sassolini et al. | 360/245.3 |
| 6,600,634 B1 | 7/2003 | Kim et al. | |
| 6,611,399 B1 | 8/2003 | Mei et al. | |
| 6,661,617 B1 | 12/2003 | Hipwell et al. | |
| 6,683,757 B1 | 1/2004 | Bonin et al. | |
| 6,690,551 B2 * | 2/2004 | Shiraishi et al. | 360/294.4 |
| 6,744,603 B1 * | 6/2004 | Soeno et al. | 360/245.6 |
| 6,751,069 B2 * | 6/2004 | Yao et al. | 360/294.4 |
| 6,760,196 B1 * | 7/2004 | Niu et al. | 360/294.6 |
| 6,851,120 B2 * | 2/2005 | Crane et al. | 720/674 |
| 6,870,709 B2 * | 3/2005 | Shimanouchi et al. | 360/294.4 |
| 7,095,591 B2 * | 8/2006 | Imamura et al. | 360/234.7 |
| 7,277,259 B2 * | 10/2007 | Yamamoto et al. | 360/294.4 |
| 7,417,831 B2 * | 8/2008 | Yao et al. | 360/294.4 |
| 7,499,246 B2 * | 3/2009 | Nakagawa | 360/294.4 |
| 7,684,158 B1 * | 3/2010 | Lauer | 360/294.4 |
| 2002/0159192 A1 | 10/2002 | Wada et al. | |
| 2006/0146449 A1 | 7/2006 | Yao et al. | |
| 2006/0238924 A1 | 10/2006 | Gatzen | |

FOREIGN PATENT DOCUMENTS

WO  WO-9825264  6/1998

OTHER PUBLICATIONS

Imamura, et al., "MEMS-Based Integrated Head/Actuator/Slider for Hard Disk Drives", *IEEE/ASME Transactions on Mechatronics*, vol. 3, No. 3, (Sep. 1998), 166-174.

Lu, et al., "A Silicon Microactuator Using Integrated Microfabrication Technology", *IEEE Transactions on Magnetics*, vol. 39, No. 5, (Sep. 2003), 2240-2242.

* cited by examiner

Primary Examiner — Angel A. Castro

(57) ABSTRACT

An integrated microactuator slider. The microactuator includes a substrate having a fixed portion and a moveable portion. The microactuator also includes a slider communicatively integrated within the moveable portion of the substrate. The slider includes a read/write head for reading data from or writing data to a data storage device. The microactuator further includes a force generator communicatively integrated within the substrate. The force generator is for causing movement of the moveable portion of the substrate.

14 Claims, 9 Drawing Sheets

INTEGRATED SILICON MICRO-ACTUATOR SLIDER

TECHNICAL FIELD

The invention relates to the field of hard disk drive slider development.

BACKGROUND ART

Direct access storage devices (DASD) have become part of everyday life, and as such, expectations and demands continually increase for greater speed for manipulating and for holding larger amounts of data. To meet these demands for increased performance, the mechano-electrical assembly in a DASD device, specifically the Hard Disk Drive (HDD) has evolved to meet these demands.

Advances in magnetic recording heads as well as the disk media have allowed more data to be stored on a disk's recording surface. The ability of an HDD to access this data quickly is largely a function of the performance of the mechanical components of the HDD. Once this data is accessed, the ability of an HDD to read and write this data quickly is primarily a function of the electrical components of the HDD.

A computer storage system may include a magnetic hard disk(s) or drive(s) within an outer housing or base containing a spindle motor assembly having a central drive hub that rotates the disk. An actuator includes a plurality of parallel actuator arms in the form of a comb that is movably or pivotally mounted to the base about a pivot assembly. A controller is also mounted to the base for selectively moving the comb of arms relative to the disk.

Each actuator arm has extending from it at least one cantilevered electrical lead suspension. A magnetic read/write transducer or head is mounted on a slider and secured to a flexure that is flexibly mounted to each suspension. The read/write heads magnetically read data from and/or magnetically write data to the disk. The level of integration called the head gimbal assembly (HGA) is the head and the slider, which are mounted on the suspension. The slider is usually bonded to the end of the suspension.

A suspension has a spring-like quality, which biases or presses the air-bearing surface of the slider against the disk to cause the slider to fly at a precise distance from the disk. Movement of the actuator by the controller causes the head gimbal assemblies to move along radial arcs across tracks on the disk until the heads settle on their set target tracks. The head gimbal assemblies operate in and move in unison with one another or use multiple independent actuators wherein the arms can move independently of one another.

To allow more data to be stored on the surface of the disk, more data tracks must be stored more closely together. The quantity of data tracks recorded on the surface of the disk is determined partly by how well the read/write head on the slider can be positioned and made stable over a desired data track. Vibration or unwanted relative motion between the slider and surface of disk will affect the quantity of data recorded on the surface of the disk.

To mitigate unwanted relative motion between the slider and the surface of the disk, HDD manufacturers are beginning to configure HDDs with a secondary actuator in close proximity to the slider. A secondary actuator of this nature is generally referred to as a microactuator because it typically has a very small actuation stroke length, typically plus and minus 1 micron. A microactuator typically allows faster response to relative motion between the slider and the surface of the disk as opposed to moving the entire structure of actuator assembly.

SUMMARY OF THE INVENTION

An integrated microactuator slider. The microactuator includes a substrate having a fixed portion and a moveable portion. The microactuator also includes a slider communicatively integrated within the moveable portion of the substrate. The slider includes a read/write head for reading data from or writing data to a data storage device. The microactuator further includes a force generator communicatively integrated within the substrate. The force generator is for causing movement of the moveable portion of the substrate.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to embodiment(s) of the present invention. While the invention will be described in conjunction with the embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of a hard disk drive and components connected within. The discussion will then focus on embodiments of the invention that provide a secondary micro-actuator within an actuator assembly and which includes an integrated slider.

Although embodiments of the present invention will be described in conjunction with a slider integrated in a micro-actuator, it is understood that the embodiments described herein are useful outside of the art of microactuators, such as devices requiring high frequency transmission between two devices that have relative motion. The integration of the slider and a microactuator is one example of embodiments of the present invention and is provided herein merely for purposes of brevity and clarity.

Overview

Figure 1:
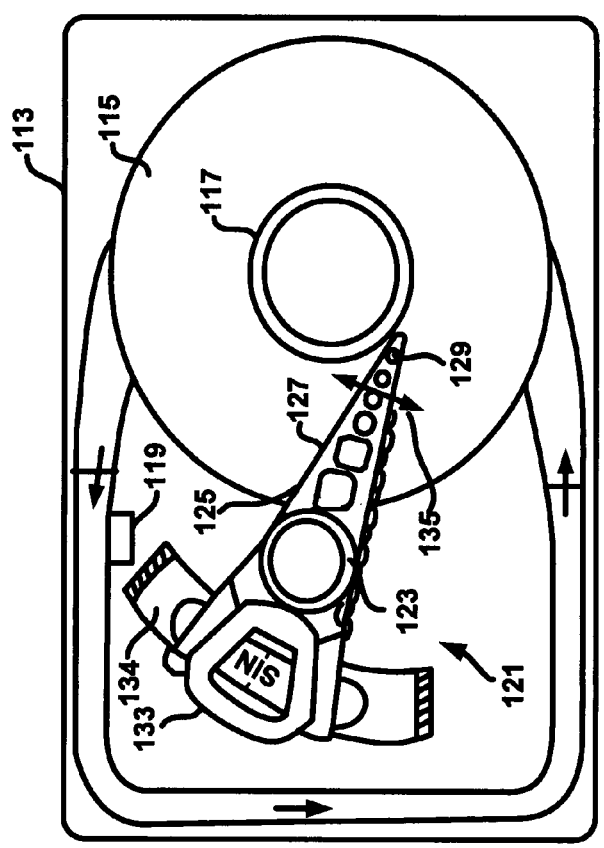
FIG. 1 is plan view of a hard disk drive (HDD) in accordance with an embodiment of the present invention.

With reference now to FIG. 1, a schematic drawing of one embodiment of an information storage system comprising a magnetic hard disk file or drive 111 for a computer system is shown. Drive 111 has an outer housing or base 113 containing a disk pack having at least one media or magnetic disk 115. A spindle motor assembly having a central drive hub 117 rotates the disk or disks 115. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered electrical lead suspension (ELS) 127. It should be understood that ELS 127 may be, in one embodiment, an integrated lead suspension (ILS) that is formed by a subtractive process. In another embodiment, ELS 127 may be formed by an additive process, such as a Circuit Integrated Suspension (CIS). In yet another embodiment, ELS 127 may be a Flex-On Suspension (FOS) attached to base metal or it may be a Flex Gimbal Suspension Assembly (FGSA) that is attached to a base metal layer. The ELS may be any form of lead suspension that can be used in a Data Access Storage Device, such as a HDD. A magnetic read/write transducer or head is mounted on a slider 129 and secured to a flexure that is flexibly mounted to each ELS 127. The read/write heads magnetically read data from and/or magnetically write data to disk 115. The level of integration called the head gimbal assembly is the head and the slider 129, which are mounted on suspension (also referred to as a flexure) 127. The slider 129 is usually bonded to the end of ELS 127

ELS 127 has a spring-like quality, which biases or presses the air-bearing surface of the slider 129 against the disk 115 to cause the slider 129 to fly at a precise distance from the disk. ELS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and move in unison with one another, unless drive 111 uses multiple independent actuators (not shown) wherein the arms can move independently of one another.

Figure 2:
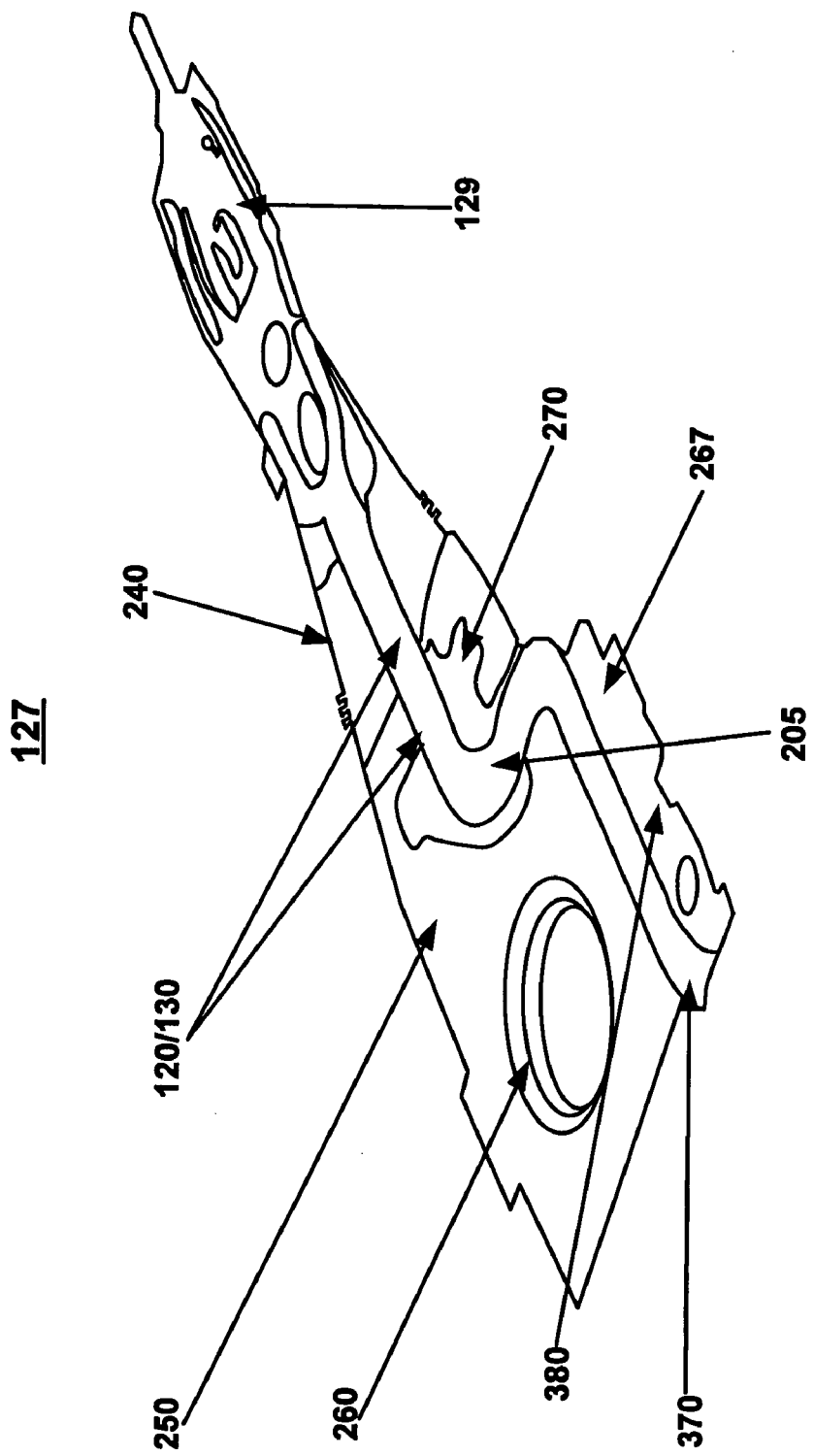
FIG. 2 is an isometric view of the suspension assembly of FIG. 1, in accordance with an embodiment of the present invention.

Referring now to FIG. 2, a top plan view of an exemplary electrical lead suspension (ELS), in according to an embodiment of the present invention. Various electrical interconnects including the read and write traces, e.g., read write traces 120 and 130, pass through the hinge center 270 of ELS 127, where load beam 240 connects, via hinge plate 250, to mount plate 260, according to an embodiment of the present invention.

Read write traces 120 and 130 are, in an embodiment of the present invention, coupled to and provide electrical and communicative connections to various components within HDD 111, including, but which is not limited to, a controller 119, a transducer, e.g., read/write head 388 of FIGS. 3-6 and 7A-7B, and one or more PZT (piezo electric) ceramics, e.g., PZTs 387 and 389 of FIGS. 3-6 and 7A-7B.

In accordance with an embodiment of the present invention, an integrated micro-actuator slider 129 resides toward the end of ELS 127, and contains the transducer, e.g., read/write head 388 of FIGS. 3-6, and 7A-7B. Slider 129 is bonded to read and write traces 120 and 130, where read and write signals are carried to and from the PZTs, e.g., PZTs 387 and 389 of FIGS. 3-6 and 7A-7B, and transducing read/write head, e.g., read/write head 388 of FIGS. 3-6 and 7A-7B.

Flex cable interconnector 267 of ELS 127 provides a communicative coupling to controller 119 and other necessary components. ELS 127 further includes flexing interconnect 205 which can be formed from a laminate, according to an embodiment, of at least three layers of materials. A signal-conductor layer may be a highly conductive metal, e.g., copper, from which the read and write traces 120 and 130 are formed. A middle layer 370 can be an insulating dielectric layer, e.g., polyimide, separating the top layer from which write and read traces 120 and 130 are formed from a base metal layer 380, such as stainless steel from which serpentine patterns are formed. Although an ELS having a flexing interconnect is shown, it is appreciated that the present invention may be implemented on a plurality of ELS configurations including an ELS having more or fewer components than the exemplary ELS described herein.

Figure 3:
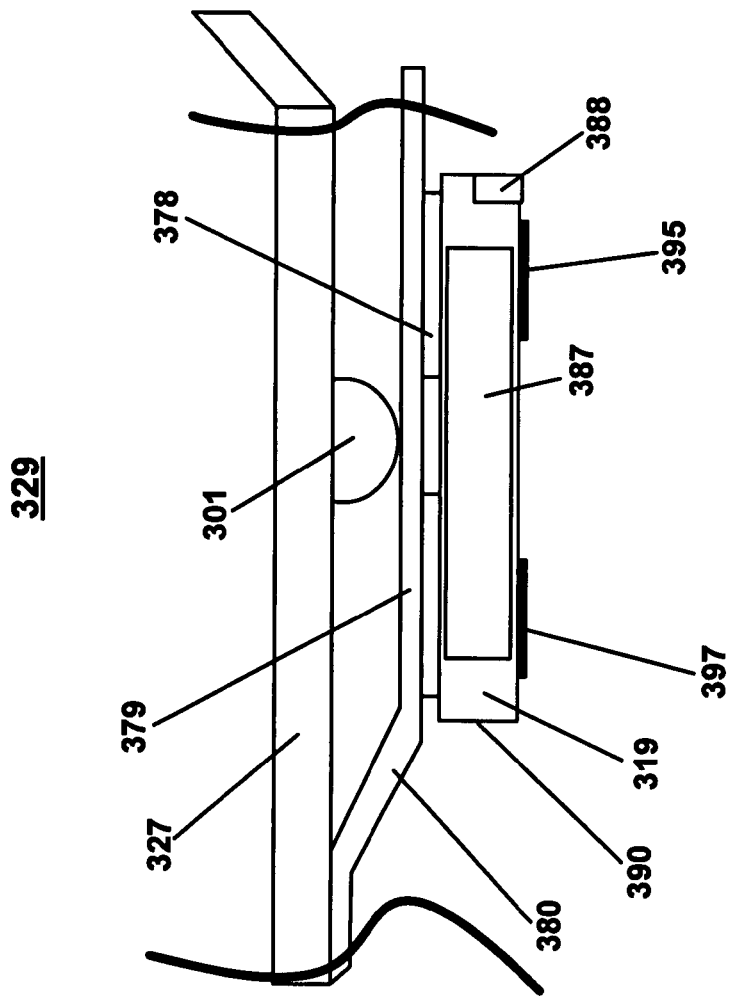
FIG. 3 is a profile view of a suspension assembly including an integrated microactuator assembly in an embodiment of the present invention.

FIG. 3 is profile view of an HGA 329, which is an assembly of slider 129 and an ELS 127 of FIGS. 1 and 2. HGA 329 shown to include a load beam 327, a loading force 301, a flexure 380, and a plurality of bonding/mounting pads 378 and 379 for bonding/mounting an integrated micro-actuator slider to flexure 380, in an embodiment of the present invention. Loading force 301, generated by load beam 327, is shown to be focused on a point on flexure 380, although loading force 301 can be focused at various points of flexure 380.

HGA 329 further includes an integrated micro-actuator 390, in accordance with an embodiment of the present invention, and which is shown to include, but is not limited to, a substrate 319, a plurality of PZT ceramics (387 and 389, as shown in FIGS. 4-6 and 7A-7B, although only one PZT, e.g., PZT 387, is shown in the perspective shown, a read/write transducer (magnetic head) 388, and one or more air bearing surface pads (ABSP), e.g., ABSPs 395 and 397.

Figure 4:
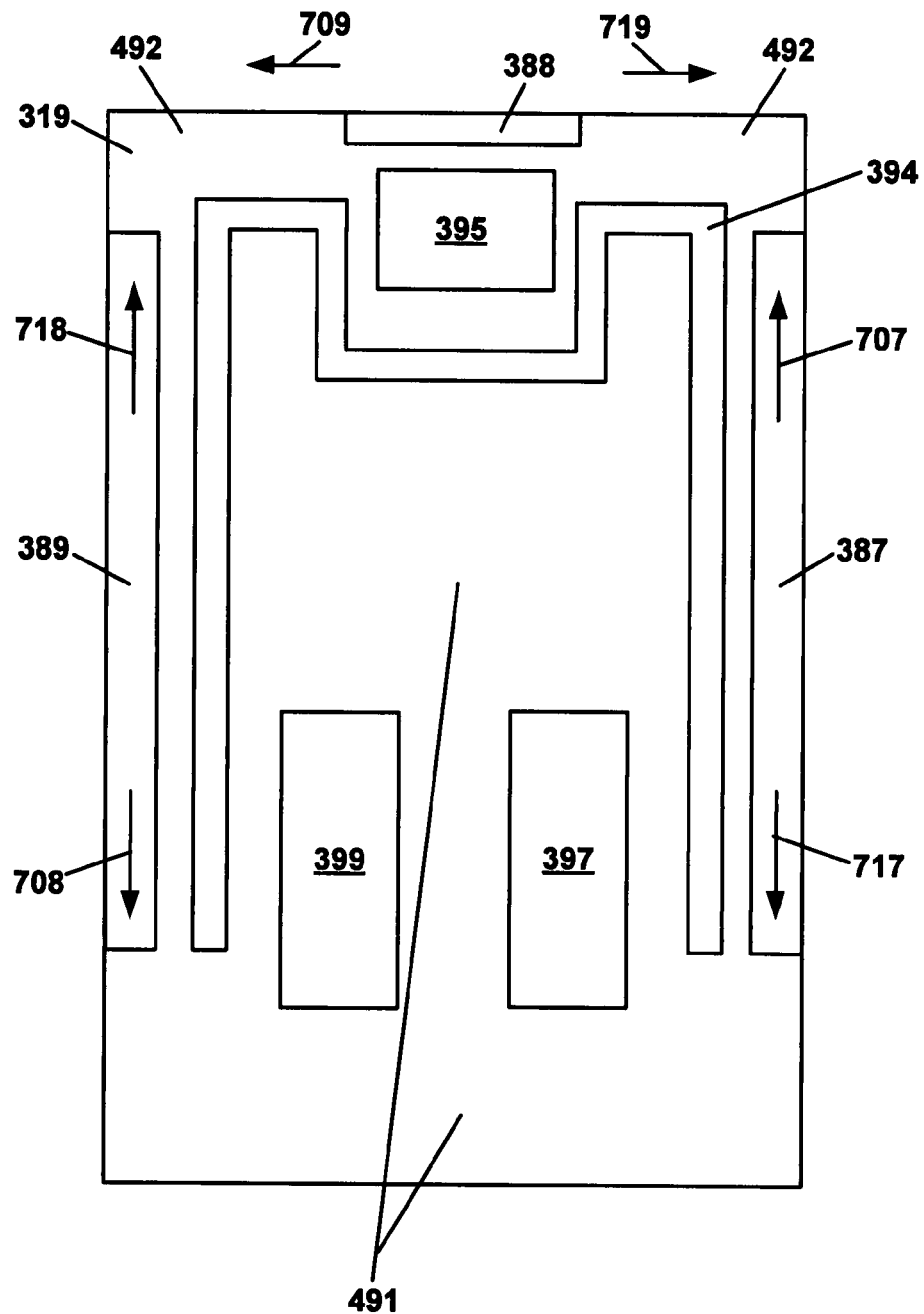
FIG. 4 is a plan view of an integrated microactuator slider, in accordance with an embodiment of the present invention.

FIG. 4 is an underneath plan view of integrated micro-actuator slider 390 of FIG. 3, in an embodiment of the present invention. Integrated micro-actuator slider 390 is shown to include a substrate 319. Substrate 319 is shown to include a fixed portion 391 and a movement capable portion 392, where the movement thereof is lateral, relative to fixed portion 391.

Substrate 319 also includes a substrate open region 394 that allows for lateral movement of movement capable portion 392.

Substrate 319 further includes a transducer, e.g., read/write head 388, for reading data from and writing data to a hard disk, e.g., disk 115 of FIG. 1. In an embodiment of the present invention, read/write head 388 is incorporated into substrate 319, such that substrate 319 and head 388 are fabricated separately and then head 388 is integrated within the structure of substrate 319. In another embodiment of the present invention, read/write head 388 is integrated within substrate 319, such that head 388 is fabricated with substrate 319 during fabrication of substrate 319.

Substrate 319 additionally includes a plurality of PZT ceramics, e.g., PZTs 387 and 389 in an embodiment of the present invention. In the embodiment shown, PZTs 387 and 389 are shown to be bonded to integrated microactuator slider 390, such that each PZT has a portion thereof bonded to fixed portion 391 of substrate 319 and another portion bonded to movement capable portion 392 of substrate 319. A PZT ceramic, e.g., PZT 387 and/or 389, can be comprised of Pb—Zr—Ti oxide (lead-zirconium-titanium). Although embodiments of the present invention are described as having two PZTs operable therewithin, in alternative embodiments there may a great number or fewer numbers of PZTs operable therewithin.

With continued reference to FIG. 4, PZTs 387 and 389 are configured to have energy, e.g., voltage, flowed there through so as to cause a dimensional change therein, e.g., an expansion or a contraction. In an embodiment of the present invention, PZT 389 may expand as indicated by arrow 718 or contract as indicated by arrow 708, and PZT 387 may expand as indicated by arrow 707 and contract as indicated by arrow 717. The dimensional change is termed a stroke. The amount of voltage applied thereto determines, in part, the length of the stroke.

The length of the stroke is further determined by the physical characteristics of the PZT ceramic. In an embodiment of the present invention, PZTs 387 and 389 are multi-layer ceramics. It is noted that a PZT ceramic with more layers can provide a greater dimensional change (larger stroke) than a PZT ceramic having fewer layers.

As voltage is applied, e.g., a positive or negative voltage, a PZT (387 or 389) expands or contracts. By virtue of having a portion of a PZT bonded to fixed portion 391 of substrate 319 and another portion bonded to movement capable portion 392 of substrate 319, the dimensional change of PZTs 387 and 389 causes lateral movement of movement capable portion of substrate 319, including read/write head 388, as indicated by movement arrows 709 and 709 in an embodiment of the present invention.

In an embodiment of the present invention, a positive voltage is applied to PZT 387, causing PZT 387 to expand (indicated by arrow 707), which in turn causes lateral movement, as indicated by arrow 709, of movement capable portion 392 of substrate 319.

In a second embodiment of the present invention, a negative voltage is applied to PZT 389, causing PZT 389 to contract (indicated by arrow 708), which in turn causes lateral movement (indicated by arrow 709) of movement capable portion 392 of substrate 319.

In a third embodiment, a positive voltage is applied to PZT 387, causing PZT 387 to expand (arrow 707), and concurrently a negative voltage is applied to PZT 389, causing PZT 389 (arrow 708), which, in combination, cause a lateral movement (indicated by arrow 709) of movement capable portion 392 of substrate 319.

In a fourth embodiment of the present invention, a positive voltage is applied to PZT 389, causing PZT 389 to expand (indicated by arrow 718), which in turn causes lateral movement (indicated by arrow 719) of movement capable portion 392 of substrate 319.

In a fifth embodiment of the present invention, a negative voltage is applied to PZT 387, causing PZT 387 to contract (indicated by arrow 717), which in turn causes lateral movement (indicated by arrow 719) of movement capable portion 392 of substrate 319.

In a sixth embodiment, a positive voltage is applied to PZT 389, causing PZT 389 to expand (indicated by arrow 718) and concurrently a negative voltage is applied to PZT 387, causing PZT 387 to contract (indicated by arrow 717), which, in combination, cause lateral movement (indicated by arrow 719) of movement capable portion 392 of substrate 319.

Referring still to FIG. 4, substrate 319 also includes one or more air bearing surface pads (ABSP), e.g., ABSPs 395, 397 and 399, in an embodiment of the present invention. ABSPs are configured to control the fly height of a read/write head over a hard disk from which a read/write head may read data or to which a read/write head may write data, in accordance with an embodiment of the present invention. ABSPs are further configured to prevent damage of read/write heads and/or surfaces of a hard disk and/or a substrate if contact between a read/write head and a hard disk surface occurs during operation. In an embodiment of the present invention, ABSPs 397 and 399 are bonded to fixed portion 391 of substrate 319 and ABSP 395 is bonded to moveable portion 392 of substrate 319.

Figure 5:
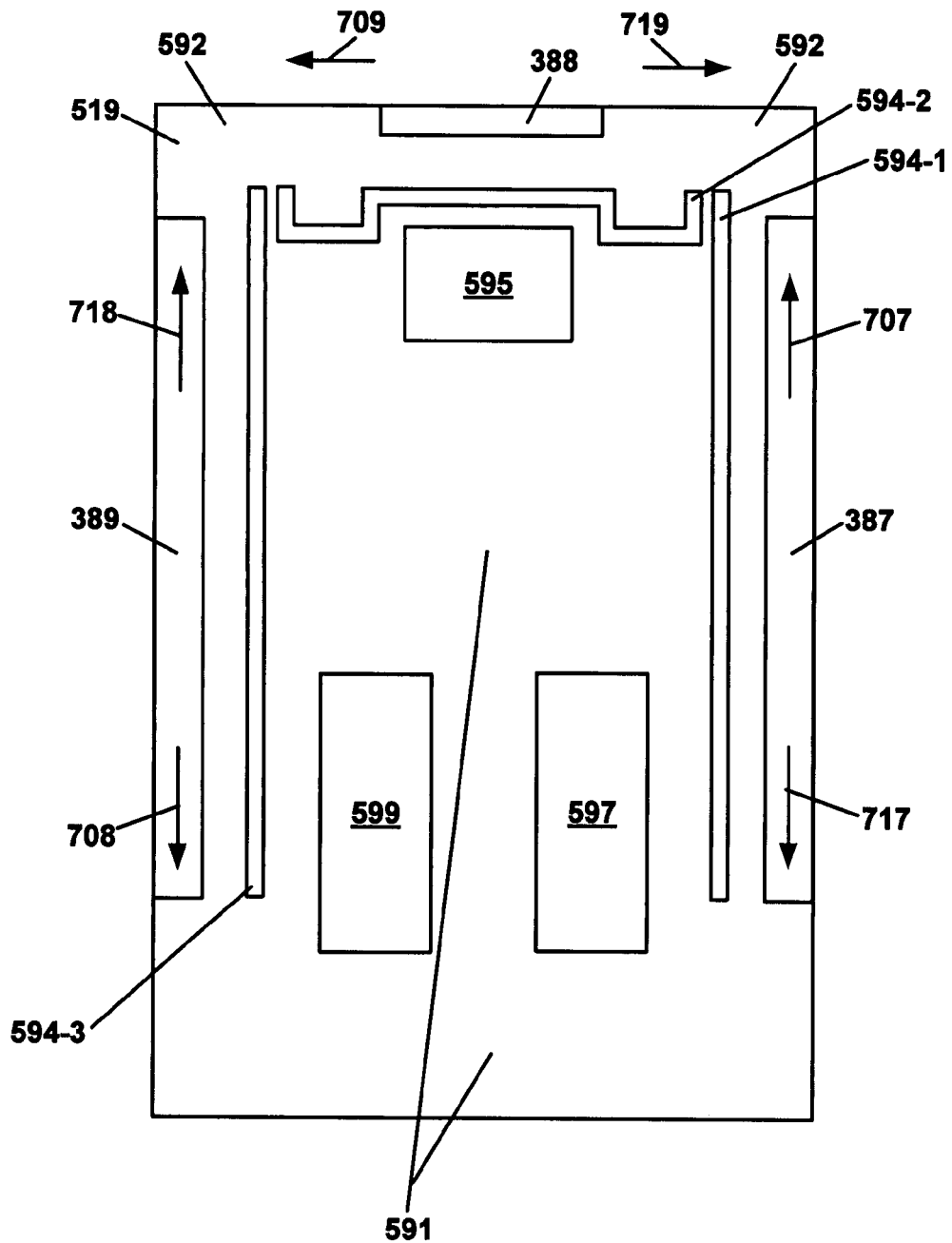
FIG. 5 is a plan view of another integrated microactuator slider, in accordance with an embodiment of the present invention.

FIG. 5 is an underneath plan view of an integrated microactuator slider 590, in accordance with an embodiment of the present invention. Slider 590 includes a substrate 519 configured with a fixed portion 591 and a movement capable portion 592. Slider 590 further includes a read/write head 388 (analogous to read/write head 388 of FIGS. 3 and 4), a plurality of PZT ceramic actuators 387 and 389 (analogous to PZTs 387 and 398 of FIG. 4), and a plurality of ABSPs, e.g., ABSPs 595, 597 and 599.

It is noted that in the embodiment shown, each ABSP, functionally analogous to ABSPs shown in FIGS. 3 and 4, is shown to be bonded to fixed portion 591 of substrate 519. It is further noted that substrate 519 includes a plurality of substrate open regions 594-1, 594-2, and 594-3, which allow for lateral movement of movement capable portion 392.

Figure 6:
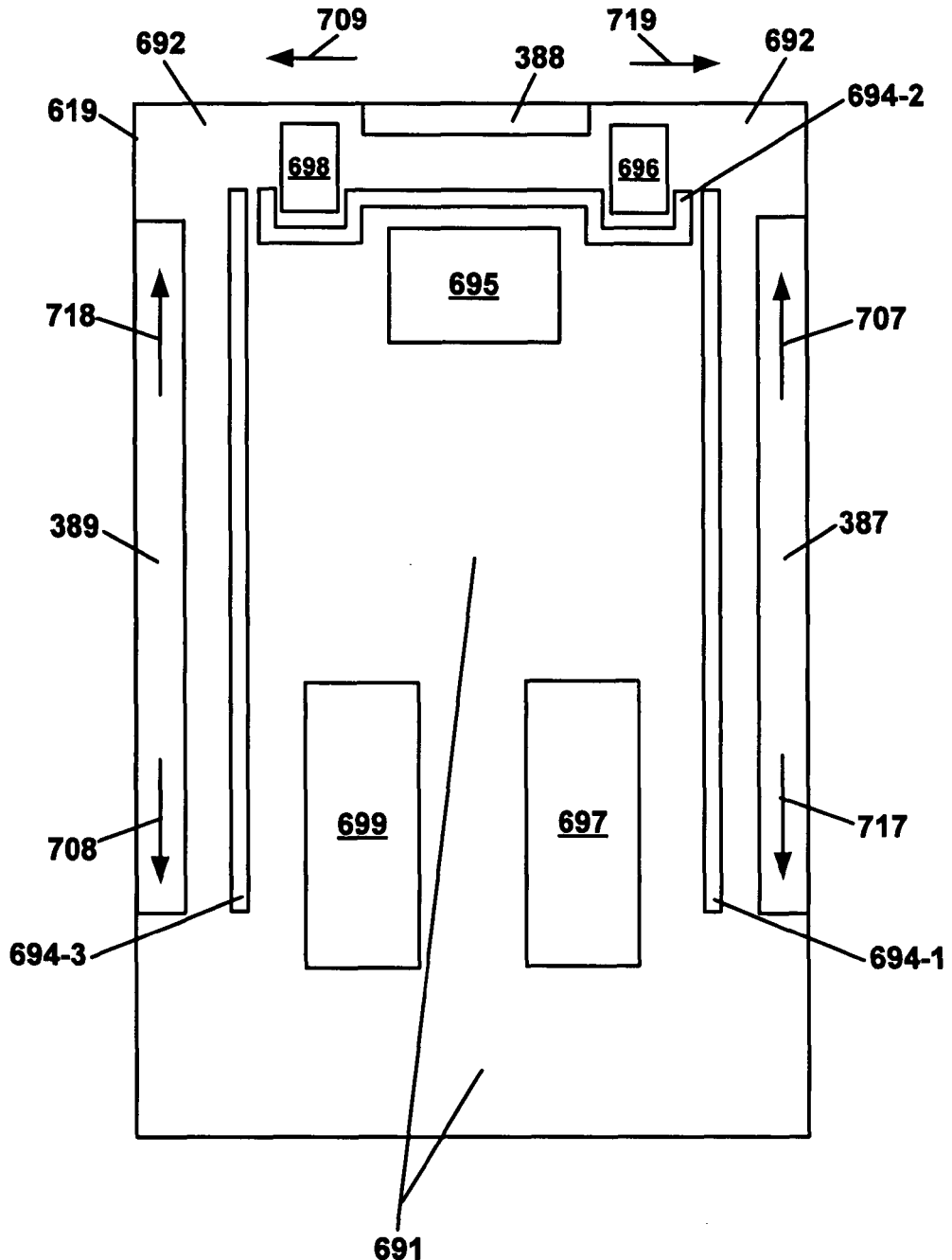
FIG. 6 is a plan view of yet another integrated microactuator slider, in accordance with an embodiment of the present invention.

FIG. 6 is an underneath plan view of an integrated microactuator slider 690, in accordance with an embodiment of the present invention. Slider 690 includes a substrate 619 configured with a fixed portion 691 and a movement capable portion 692. Slider 690 further includes a read/write head 388 (analogous to read/write head 388 of FIGS. 3, 4 and 5), a plurality of PZT ceramic actuators 387 and 389 (analogous to PZTs 387 and 398 of FIGS. 4 and 5), and a plurality of ABSPs, e.g., ABSPs 695, 696, 697, 698 and 699.

It is noted that, in the embodiment shown, ABSPs 695, 697 and 699, functionally analogous to ABSPs shown in FIGS. 3, 4 and 5, are shown to be bonded to fixed portion 691 of substrate 619. Further, and also functionally analogous to ABSPs shown in FIGS. 3, 4 and 5, ABSPs 696 and 698 are shown to be bonded to movement capable portion 692 of substrate 619.

It is further noted that substrate 619 includes a plurality of substrate open regions 694-1, 694-2, and 694-3, which allow for lateral movement of movement capable portion 392.

Figure 7A:
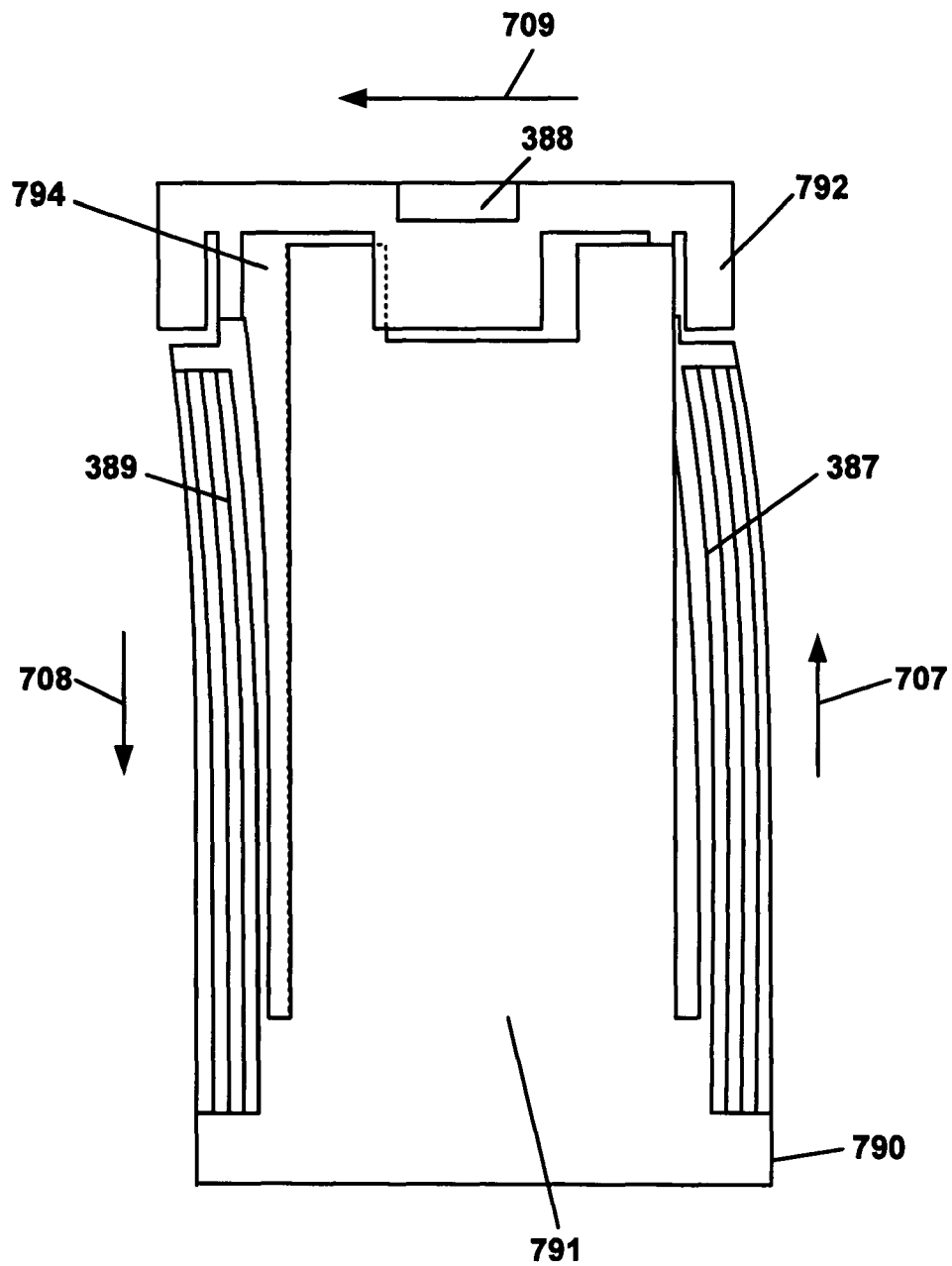
FIG. 7A is a plan view of an integrated microactuator slider illustrating forces that may be applied thereto, in accordance with an embodiment of the present invention.

FIG. 7A is a plan view of an integrated microactuator slider 790 depicting a right-to-left lateral movement as described herein with reference to FIG. 4, in accordance with an embodiment of the present invention. Slider 790 is functionally and characteristically analogous to slider 390 of FIG. 4, and includes a substrate 719, but it is noted that ABSPs, bonded to substrate 719, are not shown in FIG. 7A.

In an embodiment of the present invention, a positive voltage is applied to PZT 387, causing PZT 387 to expand (indicated by arrow 707), termed a positive stroke, which in turn causes lateral movement of movement capable portion 392 of substrate 319, as indicated by arrow 709.

In a second embodiment of the present invention, a negative voltage is applied to PZT 389, causing PZT 389 to contract (indicated by arrow 708), termed a negative stroke, which in turn causes lateral movement (indicated by arrow 709) of movement capable portion 392 of substrate 319.

In a third embodiment, a positive voltage is applied to PZT 387, causing PZT 387 to expand (arrow 707), and concurrently a negative voltage is applied to PZT 389, causing PZT 389 to contract (arrow 708), which, in combination, cause a lateral movement (indicated by arrow 709) of movement capable portion 392 of substrate 319.

Still referring to FIG. 7A, in each embodiment above, substrate open region 794 allows for the lateral movement of portion 792 in a right-to-left direction (indicated by arrow 709), with such that a repositioning of read/write head 388 is achieved.

Figure 7B:
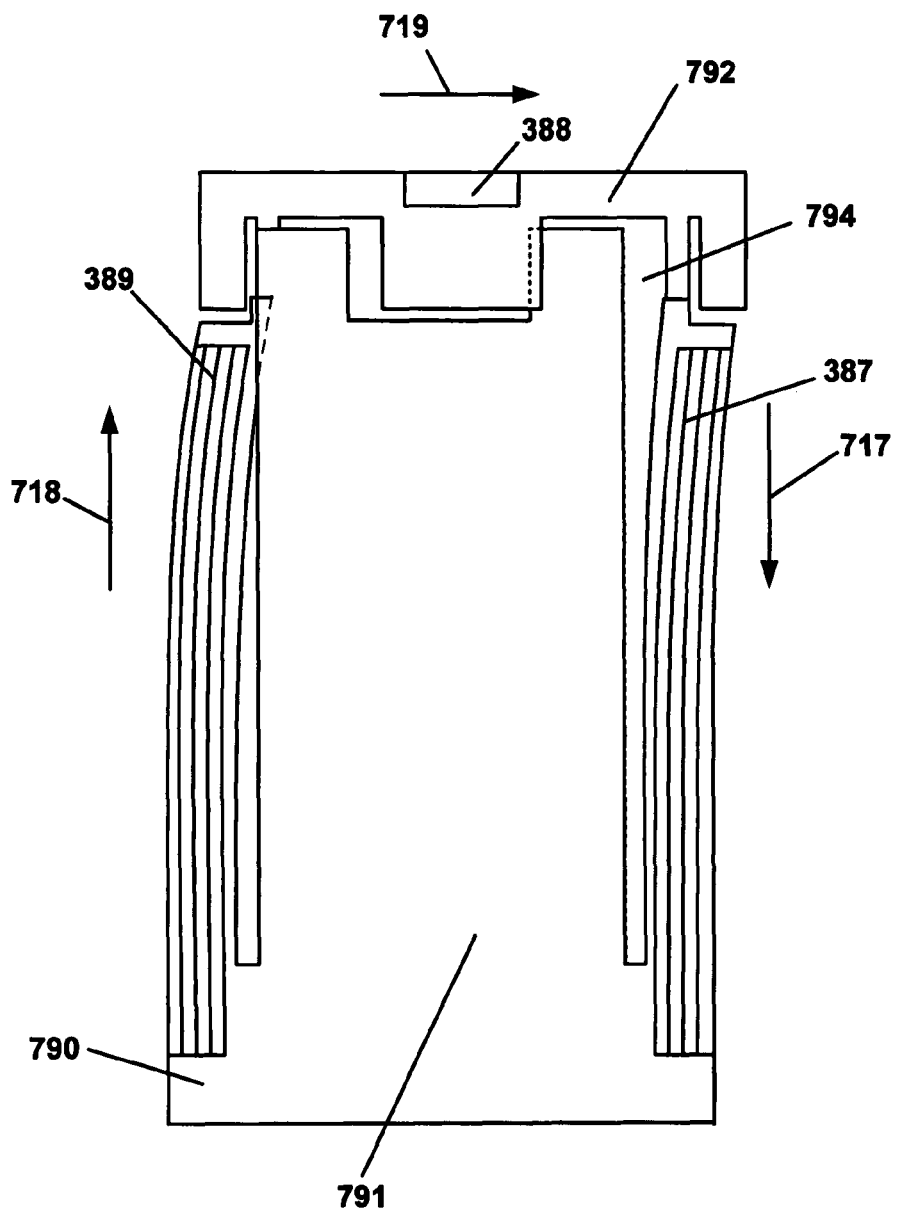
FIG. 7B is a plan view of an integrated microactuator slider illustrating forces, opposite to forces shown in FIG. 7A, that may be applied thereto, in accordance with an embodiment of the present invention.

FIG. 7B is a plan view of integrated microactuator slider 790 of FIG. 7A depicting a left-to-right lateral movement as described herein with reference to FIG. 4, in accordance with an embodiment of the present invention. Slider 790 is functionally and characteristically analogous to slider 390 of FIG. 4, and includes a substrate 719, but it is noted that ABSPs, bonded to substrate 719, are not shown in FIG. 7B.

In an embodiment of the present invention, a positive voltage is applied to PZT 389, causing PZT 389 to expand (indicated by arrow 718), which in turn causes lateral movement (indicated by arrow 719) of movement capable portion 392 of substrate 319.

In a second embodiment of the present invention, a negative voltage is applied to PZT 387, causing PZT 387 to contract (indicated by arrow 717), which in turn causes lateral movement (indicated by arrow 719) of movement capable portion 392 of substrate 319.

In a third embodiment, a positive voltage is applied to PZT 389, causing PZT 389 to expand (indicated by arrow 718) and concurrently a negative voltage is applied to PZT 387, causing PZT 387 to contract (indicated by arrow 717), which, in combination, cause lateral movement (indicated by arrow 719) of movement capable portion 392 of substrate 319.

Still referring to FIG. 7B, in each of the embodiments above, substrate open region 794 allows for the lateral movement of portion 792 in a right-to-left direction (indicated by arrow 709), with such that a repositioning of read/write head 388 is achieved.

Figure 8:
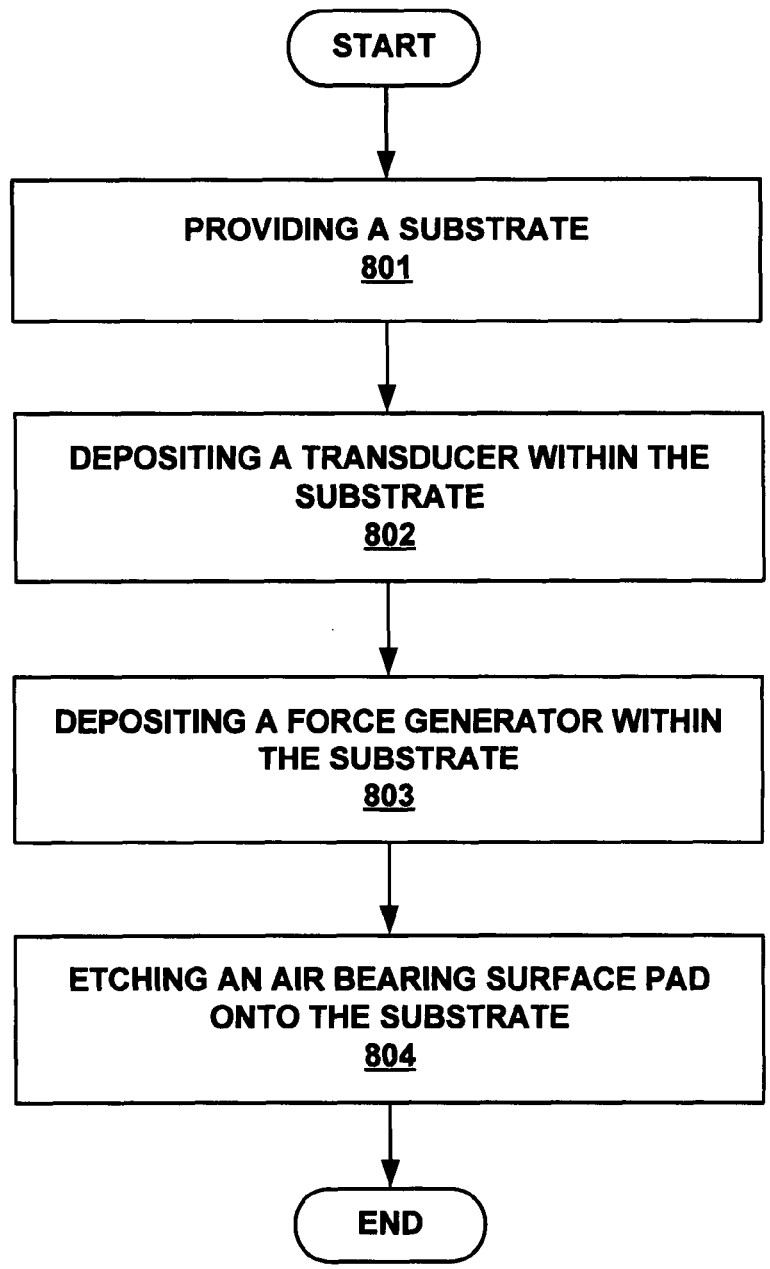
FIG. 8 is flowchart of a process for fabricating an integrated micro-actuator slider, in accordance with an embodiment of the present invention.

FIG. 8 is a flowchart of a process 800 for fabricating an integrated microactuator slider in an embodiment of the present invention. FIG. 9 is a flow chart of a process 900 in which particular steps are performed in accordance with an embodiment of the present invention for fabricating an integrated microactuator slider. Although specific steps are disclosed in process 800, such steps are exemplary. That is, the present invention is well suited to performing various other steps or variations of the steps recited in FIG. 8. Within the present embodiment, it should be appreciated that the steps of process 800 may be performed by software, by hardware, by an assembly mechanism, through human interaction, or by any combination of software, hardware, assembly mechanism, and human interaction.

Process 800 will be described with reference to components and devices shown in FIGS. 3, 4-6 and FIGS. 7A and 7B.

In step 801 of process 800 for fabricating an integrated microactuator slider, a substrate is provided, e.g., substrate 319, 519, 619 or 719. In an embodiment of the present invention, the substrate includes a fixed portion, e.g., fixed portion 391, 491, 591, 691 or 791, and a movement capable portion, e.g., movement capable portion 392, 592, 692 or 792, respectively, and is comprised substantially of silicon.

In an embodiment of the present invention, the substrate can further include one or more substrate open regions, e.g., substrate open regions 394, 594-1, 594-1, 594-3, 694-1, 694-2, 694-3 and 794. The substrate open regions allow for movement of the movement capable portion of the substrate.

In step 802 of process 800, a read/write head, e.g., read/write head 388, is deposited within a substrate, in an embodiment of the present invention. Any of a number of methods for depositing including, but not limited to, lithographic additive and/or subtractive processes, may be implemented to achieve the deposition of a read/write head. In an embodiment of the present invention, read/write head 388 may be fabricated during and in conjunction with the fabrication of the substrate. Alternatively, read/write head 388 may be fabricated separately and then integrated within the substrate during substrate fabrication.

In step 803 of process 800, a force generator is deposited within the substrate. Any of a number of methods for depositing including, but not limited to, lithographic additive and/or subtractive processes, may be implemented to achieve the deposition of a force generator. In an embodiment of the present invention, the force generator is a plurality of PZT ceramic actuators, e.g., PZTs 387 and 389, in which each PZT is communicatively integrated within said substrate, such that a portion of each PZT is bonded to the moveable capable portion of the substrate, and another portion of each PZT is bonded to the fixed portion of the substrate.

PZTs 378 and 389 are for effecting a lateral motion of the moveable capable portion of said substrate, as described herein with reference to FIG. 4 and FIGS. 7A and 7B. In an embodiment of the present invention, PZTs 378 and 379 may be fabricated during fabrication of the substrate. Alternatively, PZTs 378 and 379 may be fabricated separately and then integrated within the substrate.

In step 804 of process 800, an air bearing surface pad is etched into the substrate. Any of a number of methods for etching including, but not limited to, lithographic additive and/or subtractive processes, may be implemented to achieve the etching of an air bearing surface pad. In an embodiment of the present invention, one or more ABSPs may be disposed on the substrate. In an embodiment of the present invention, one or more ABSPs may be bonded to the fixed portion of the substrate. In another embodiment of the present invention, one or more ABSPs may be bonded to the movement capable portion of the substrate. In yet another embodiment of the present invention, one or more ABSPs may be bonded to the fixed portion of the substrate while one or more ABSPs may be bonded to the movement capable portion of the substrate.

Embodiments of the present invention, in the various presented embodiments, provide an integrated microactuator slider assembly.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An integrated microactuator comprising:
   a substrate having a fixed portion and a moveable portion;
   a slider communicatively integrated within said moveable portion of said substrate, said slider comprising a read/write head for reading data from or writing data to a data storage device;
   a force generator communicatively integrated within said substrate, said force generator for causing movement of said moveable portion of said substrate; and
   an air bearing surface pad bonded to a surface of substrate and configured to be interposed between said substrate and a data storage surface of said data storage device.

2. The integrated microactuator as recited in claim 1 wherein said air bearing surface pad is bonded to said fixed portion of said substrate.

3. The integrated microactuator as recited in claim 1 wherein said air bearing surface pad is bonded to said moveable portion of said substrate.

4. The integrated microactuator as recited in claim 1 wherein said force generator comprises:
   an actuator disposed within said substrate, said actuator a piezoelectric (PZT) ceramic, said actuator having a portion bonded to said fixed portion of said substrate and another portion bonded to said moveable portion of said substrate, said actuator configured to effect positional change upon said moveable portion of said substrate.

5. The integrated microactuator as recited in claim 4 wherein said actuator further comprises stroke adjustability, wherein dimensional change realized in said stroke during an application of energy is variable.

6. The integrated microactuator of claim 1 wherein said substrate is comprised substantially of silicon.

7. A hard disk drive comprising:
   a housing;
   a disk pack mounted to the housing and having a, at least one, disk that is/are rotatable relative to the housing, said disk pack defining an axis of rotation and a radial direction relative to the axis;
   an actuator mounted to the housing and being movable relative to said disk pack; and
   an electrical lead suspension coupled to said actuator, said electrical lead suspension (ELS) having an integrated microactuator slider, said integrated microactuator slider comprising:
      a substrate having a stationary portion and a non-stationary portion;
      a read/write head communicatively integrated within said non-stationary portion of said substrate, said read/write head for reading data from and writing data to said disk;
      an air bearing surface pad disposed on said stationary portion of said substrate and configured to be interposed between said surface and a data storage surface of said disk; and
      a force generator disposed within said substrate, wherein a portion of said force generator is bonded to said stationary portion of said substrate and wherein another portion of said force generator is bonded to said non-stationary portion of said substrate, said force generator for effecting movement of said non-stationary portion of said substrate.

8. The hard disk drive as recited in claim 7 further comprising:
   another air bearing surface pad bonded to said non-stationary portion of said substrate, said another air bearing surface pad configured to be interposed between said substrate and a data storage surface of said disk.

9. The hard disk drive as recited in claim 7 wherein said force generator is an actuator, said actuator a piezoelectric (PZT) ceramic.

10. The hard disk drive of claim 9 wherein said actuator is a multi-layer ceramic actuator.

11. The hard disk drive as recited in claim 7 wherein said force generator comprises:
    a first actuator communicatively integrated within said substrate; and
    a second actuator communicatively integrated within said substrate, wherein said first and second actuator are configured to effect positional change upon said moveable portion.

12. The hard disk drive as recited in claim 11 wherein said first actuator and said second actuator are each a PZT ceramic, said PZT ceramic a multi-layer ceramic.

13. The hard disk drive as recited in claim 7 wherein said substrate is comprised substantially of silicon.

14. The hard disk drive as recited in claim 7 wherein said movement of said non-stationary portion is lateral relative to said stationary portion.

\* \* \* \* \*